July 10, 1928.

S. O. WHITE

AUXILIARY TRANSMISSION

Filed Jan. 5, 1925

INVENTOR.
Samuel O. White,
BY
Hood + Hahn.
ATTORNEYS

July 10, 1928.
S. O. WHITE
AUXILIARY TRANSMISSION
Filed Jan. 5, 1925
1,676,758
2 Sheets-Sheet 2
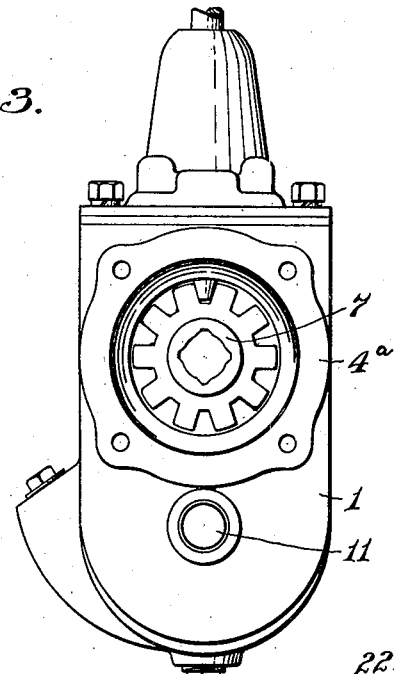
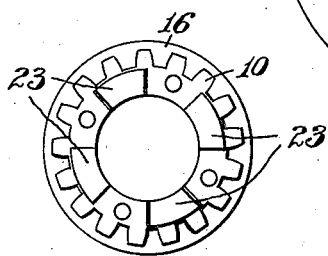
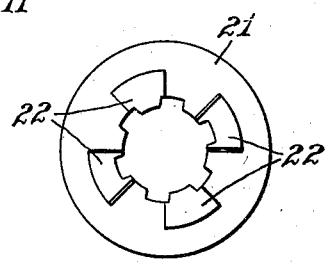
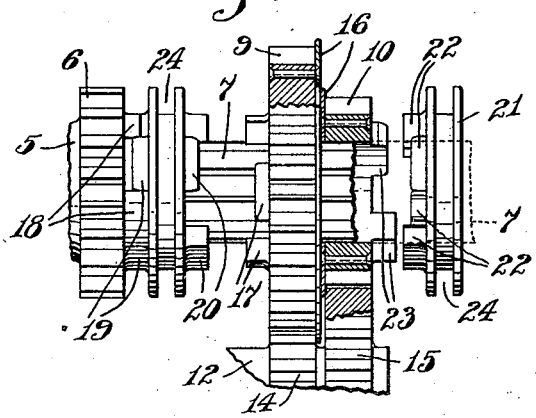
INVENTOR.
Samuel O. White,
BY
Hood + Hahn.
ATTORNEYS Patented July 10, 1928.

1,676,758

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

AUXILIARY TRANSMISSION.

Application filed January 5, 1925. Serial No. 558.

My invention relates to improvements in speed changing transmissions for automobiles and, while my invention may be used in a variety of associations, it is particularly designed as an auxiliary transmission for Ford automobiles.

One of the objects of my invention is to provide a transmission mechanism which will give a variety of speeds, including a speed lower than the normal engine speed, a speed at the normal engine speed and an over speed which shall be higher than the engine speed or the speed at which the driving shaft operated from the engine is operated.

For the purpose of disclosing my invention I have illustrated one embodiment thereof in the accompanying drawings in which:

Fig. 3 is a rear elevation thereof;

Fig. 4 is a detailed view of the clutching mechanism for the transmission;

Fig. 5 is a face view of one of the clutches, and

Fig. 6 is a similar view of the opposite clutch member.

Figure 1:
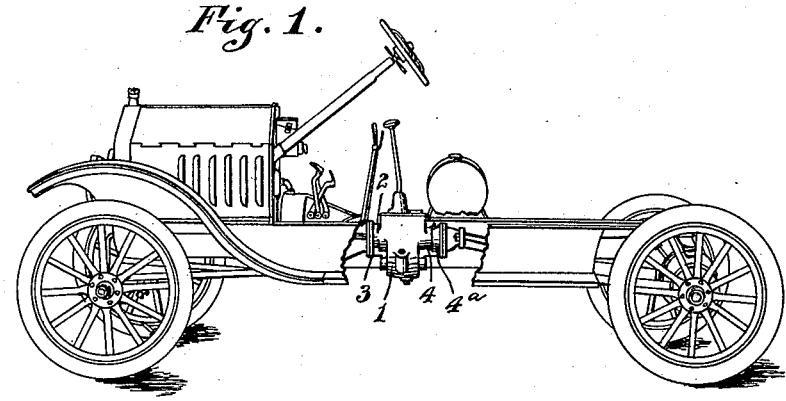
Fig. 1 is a side elevation partly in section of a Ford chassis showing my auxiliary transmission mounted in position.
Figure 2:
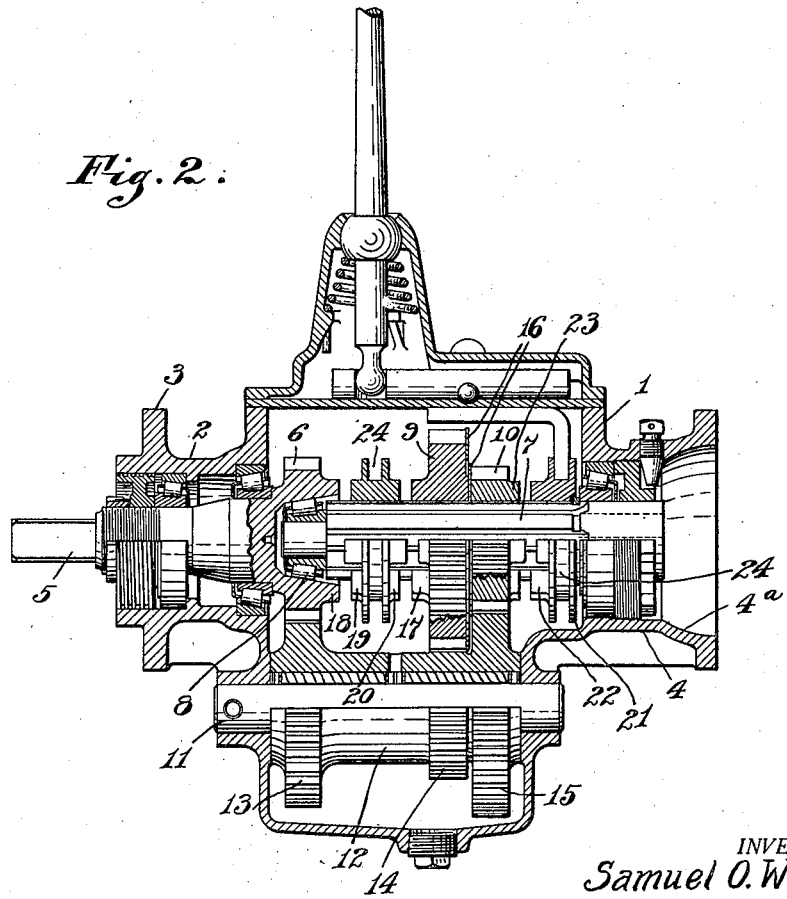
Fig. 2 is a longitudinal sectional view of the auxiliary transmission.

In the embodiment illustrated I provide a transmission casing 1 which at its forward end is provided with an extension neck 2 having an annular flange 3. The neck and flange are constructed to assemble with the rear of the present Ford transmission. The rear end of the transmission casing is provided with a neck 4 having a belled end 4ª which will assemble with the propeller shaft of the Ford without modification other than the shortening of the shaft.

Journaled within the neck 2 in suitable roller bearings is a drive shaft 5 having at its inner end a gear 6 recessed to receive the forward end of the secondary drive shaft 7. The forward end of this shaft is journaled in the recess in the gear 6 and operates in suitable roller bearings 8. The rear end of this shaft is adapted to be connected with and drive the transmission shaft of the automobile. This shaft 7 is splined throughout its entire length and has mounted thereon a pair of floating gears 9 and 10 which gears are adapted to be connected with the shaft but normally are rotatable on the shaft. Mounted in the lower part of the transmission is a counter-shaft 11 on which is rotatably mounted a spindle 12. This spindle is provided with three gears 13, 14 and 15 adapted to mesh respectively with the gears 6, 9 and 10. Due to the fact that the gears 13 and 6 are in mesh, the spindle 12 is constantly driven from the shaft 5 as well as the gears 9 and 10. However, as the gears 9 and 10 are normally rotatable on the shaft 7 these gears will rotate without affecting the shaft. Each of the gears 9 and 10 is provided with an annular ring 16 secured on the face of the gear and projecting at least to the top of the teeth of the gear. These shrouds or annular rings fit between the gears 14 and 15, and due to the fact that the gears 14 and 15 are longitudinally stationary on the spindle 12, position the gears 9 and 10 on the shaft 7 and hold them against longitudinal displacement on this shaft. One face of the gear 9 is provided with a series of jaw teeth 17, some of which are of greater height than the others, the low teeth alternating with the high teeth. The face of gear 6 is provided with a series of jaw teeth 18 similar in construction. Splined on the shaft 7, between the gears 6 and 9 is a clutch member having on its opposite face teeth 19 and 20 of a construction similar to the jaw teeth 17 and 18 and adapted to respectively engage the teeth 18 and 17 for the purpose of either connecting the shaft 7 directly to the shaft 5 or connecting the gear 9 to the shaft 7. A second clutch member 21 is splined on the shaft 7 and is provided with jaw teeth 22 alternately high and low which are adapted to engage with jaw teeth 23 on the face of the gear 10 to thereby connect the gear 10 with the shaft 7. Each of these clutch members is provided with an annular groove 24 in which is adapted to engage a suitable shifting fork. When shaft 7 is directly connected to the shaft 5 it will of course be driven at the same speed as the shaft 5. When, however, the shaft 7 is disconnected from the shaft 5 and the gear 9 is connected with the shaft 7, due to the fact that the drive from shaft 5 will be by the way of gears 6, 13, 14 and 9, the shaft 7 will be driven at a much lower speed than that of the shaft 5. In event it is desired to attain a higher speed the gear 10 is connected to shaft 7 while gear 9 is disconnected, and then due to the fact that the drive will be by the way of gears 6, 13, 15 and 10, the shaft 7 will be driven at a higher speed than that of the shaft 5.

While the transmission is used in connection with a Ford transmission I am enabled to get a wide range of speeds as without shifting the Ford transmission I can shift the auxiliary transmission to obtain a low speed, which low speed, however, is not as low as that of the normal Ford low speed. In event, however, increased power is desired, by shifting the Ford transmission into low and also shifting the auxiliary transmission into low the tractive power is considerably increased. Furthermore, by shifting the auxiliary transmission into high the normal speed of the propeller or transmission shaft is raised beyond the speed at which the shaft 5 is driven by the engine, whereby I am enabled to attain a speed higher than the normal high speed drive of the Ford transmission.

I claim as my invention:

1. In an automobile transmission the combination with a casing, of a driving and a secondary driving shaft journaled therein and having a continuous spline thereon, a pair of gears floatingly mounted on said secondary driving shaft, a counter-shaft, a pair of gears mounted on said counter-shaft constantly driven from said driving shaft and held against lateral displacement and arranged to mesh with the floating gears on the secondary driving shaft, annular plates on said floating gears projecting between the counter-shaft gears to prevent lateral displacement of the floating gears, a clutch member splined on said secondary shaft and having oppositely disposed dental clutches arranged to co-operate with dental clutch teeth on the driving shaft and dental clutch teeth on one of said floating gears and a second clutch member splined on said shaft having dental clutch teeth co-operating with dental clutch teeth on the opposite floating gear.

2. In an automobile transmission the combination with a casing, of a driving shaft and a secondary driving shaft journaled in said casing and having continuous splines thereon, a pair of gears floatingly mounted on said secondary driving shaft, a gear formed on said primary driving shaft, a counter-shaft, and a set of gears inter-connected mounted on said counter-shaft and connecting respectively with the gear on said driving shaft and with said floating gears whereby said floating gears are constantly driven from said driving shaft, annular plates on said floating gears projecting between said counter-shaft gears to prevent lateral displacement of the floating gears, a clutch member splined and longitudinally slidable on said secondary driving shaft and arranged when in one position to connect said secondary driving shaft with the driving shaft, and when in another position to connect one of said floating gears with the driving shaft, and a second clutch member splined and longitudinally movable on said secondary driving shaft for connecting the other floating gear to the secondary driving shaft.

3. In an automobile transmission the combination with a casing, of a driving shaft and a secondary driving shaft mounted therein, and having continuous splines thereon, a gear on said driving shaft, a set of gears for driving said secondary driving shaft including a gear floatingly mounted on said secondary driving shaft and a gear mounted on a counter-shaft and driven from the driving shaft the ratio of said gears being such as to drive said secondary driving shaft at a speed greater than the driving shaft, a second set of gears including a floating gear on the secondary driving shaft and a gear on the counter-shaft driven from the driving shaft and having a speed ratio such as to drive the secondary driving shaft at a speed lower than that of the driving shaft, said floating gears having annular plates thereon engaging the gears on the secondary shaft to prevent lateral displacement of the floating gears, and clutch members splined on said secondary shaft and longitudinally shiftable for connecting said floating gears to the secondary driving shaft.

4. In an automobile transmission, the combination with a casing, of a driving shaft and a secondary driving shaft journaled therein and having continuous splines thereon, a gear on said driving shaft, a pair of floating gears on said secondary driving shaft, a counter-shaft and a set of three gears connected together and mounted on said counter-shaft the first of said gears being adapted to mesh with the gear on the driving shaft, the second of said gears being adapted to mesh with one of said floating gears with a speed ratio to cause the secondary driving shaft to be operated at a higher speed than the driving shaft, the third of said gears being adapted to mesh with the second floating gear on said secondary driving shaft, and having a speed ratio for driving said secondary driving shaft at a speed lower than the driving shaft, said floating gears having annular plates thereon engaging the gears on the counter-shaft to prevent annular displacement of the floating gears, a clutch member splined and longitudinally slidable on said secondary driving shaft for connecting said over speed driving gear with the shaft and a second clutch member splined and longitudinally slidable on said shaft for connecting said under speed driving gear with the shaft when in one position and for directly connecting the secondary driving shaft with the driving shaft when in another position.

In witness whereof, I, SAMUEL O. WHITE, have hereunto set my hand at Muncie, Indiana, this 31st day of December, A. D. one thousand nine hundred and twenty-four.

SAMUEL O. WHITE.